US007743285B1

(12) United States Patent
Aggarwal et al.

(10) Patent No.: US 7,743,285 B1
(45) Date of Patent: Jun. 22, 2010

(54) CHIP MULTIPROCESSOR WITH CONFIGURABLE FAULT ISOLATION

(75) Inventors: Nidhi Aggarwal, Madison, WI (US); Norman P. Jouppi, Palo Alto, CA (US); Parthasarathy Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 11/787,881

(22) Filed: Apr. 17, 2007

(51) Int. Cl.
*G06F 11/00* (2006.01)
(52) U.S. Cl. ...................................... 714/43
(58) Field of Classification Search .................... 714/43
See application file for complete search history.

(56) References Cited

U.S. PATENT DOCUMENTS

| 5,588,111 | A | * | 12/1996 | Cutts et al. ...................... 714/9 |
| 6,151,684 | A | * | 11/2000 | Alexander et al. .............. 714/4 |
| 6,427,163 | B1 | * | 7/2002 | Arendt et al. ................. 709/201 |
| 7,308,605 | B2 | * | 12/2007 | Jardine et al. ................. 714/11 |
| 7,412,479 | B2 | * | 8/2008 | Arendt et al. ................. 709/200 |
| 2002/0152420 | A1 | * | 10/2002 | Chaudhry et al. ............. 714/11 |
| 2005/0240806 | A1 | * | 10/2005 | Bruckert et al. ............... 714/6 |
| 2007/0022348 | A1 | * | 1/2007 | Racunas et al. ............. 714/735 |
| 2007/0260939 | A1 | * | 11/2007 | Kammann et al. ............ 714/48 |
| 2007/0282967 | A1 | * | 12/2007 | Fineberg et al. ............. 709/214 |

OTHER PUBLICATIONS

B. T. Gold, J. C. Smolens, B. Falsafi, and J. C. Hoe, "The Granularity of Soft-Error Containment in Shared Memory Multiprocessors", 2006, Proceedings of the Workshop on Silicon Errors in Logic—System Effects (SELSE).

D. J. Sorin et al. "SafetyNet: improving the availability of shared memory multiprocessors with global checkpoint/recovery", Jun. 2002, In Proc. of 29th Intl. Symp. on Comp. Arch. (ISCA-29).

M. Prvulovic et al. "ReVive: cost-effective architectural support for rollback recovery in shared memory multiprocessors", Jun. 2002, In Proc. of 29th Intl. Symp. on Comp. Arch. (ISCA-29).

T. M. Austin, "DIVA: A reliable substrate for deep submicron microarchitecture design", Nov. 1999, In Proc. of the 32nd Intl. Symp. on Microarchitecture.

M. K. Qureshi et al. "Microarchitecture-based introspection: A technique for transient-fault tolerance in microprocessors", Jun. 2005, In Proc. of 32nd Intl. Symp. on Comp. Arch. (ISCA-32).

J. Ray et al. "Dual use of superscalar datapath for transient-fault detection and recovery", Dec. 2001, In Proceedings of the 34th International Symposium on Microarchitecture.

(Continued)

*Primary Examiner*—Bryce P Bonzo (57) ABSTRACT

One embodiment relates to a high-availability computation apparatus including a chip multiprocessor. Multiple fault zones are configurable in the chip multiprocessor, each fault zone being logically independent from other fault zones. Comparison circuitry is configured to compare outputs from redundant processes run in parallel on the multiple fault zones. Another embodiment relates to a method of operating a high-availability system using a chip multiprocessor. A redundant computation is performed in parallel on multiple fault zones of the chip multiprocessor and outputs from the multiple fault zones are compared. When a miscompare is detected, an error recovery process is performed. Other embodiments, aspects and features are also disclosed.

23 Claims, 10 Drawing Sheets

OTHER PUBLICATIONS

J. C. Smolens et al. "Fingerprinting: Bounding soft-error detection latency and bandwidth", Oct. 2004. 224-234, In Proc. of Eleventh Intl. Conf. on Arch. Support for Program. Lang. and Op. Syst. (ASPLOS XI), Boston, Massachusetts.

S. K. Reinhardt and S. S. Mukherjee "Transient fault detection via simultaneous multithreading", Jun. 2000, In Proceedings of the 27th International Symposium on Computer Architecture.

E. Rotenberg "AR-SMT: A microarchitectural approach to fault tolerance in microprocessors", Jun. 1999, In Proceedings of the 29th International Symposium on Fault-Tolerant Computing.

T. N. Vijaykumar et al. "Transient-fault recovery using simultaneous multithreading", May 2002, In Proceedings of the 29th International Symposium on Computer Architecture.

M. Gomaa et al. "Transient-fault recovery for chip multiprocessors", Jun. 2003, In Proceedings of the 30th International Symposium on Computer Architecture.

S. S. Mukherjee et al. "Detailed design and evaluation of redundant multithreading alternatives", May 2002, pp. 99-110, In Proceedings of the 29th International Symposium on Computer Architecture.

K. Sundaramoorthy et al. "Slipstream processors: Improving both performance and fault tolerance", Oct. 2000, In ASPLOS.

W. Bartlett and B. Ball, "Tandem's Approach to Fault Tolerance," Feb. 1988, pp. 84-95, Tandem Systems Rev., vol. 4, No. 1.

B. T. Gold et al. "TRUSS: a reliable, scalable server architecture", Nov.-Dec. 2005, IEEE Micro.

Russ Joseph, "Exploring Salvage Techniques for Multi-core Architectures", 2005, Workshop on High Performance Computing Reliability Issues.

F. Bower et al. "Tolerating hard faults in microprocessor array structures", 2004, In proceedings of the International Conference on Dependable Systems and Networks.

Premkishore Shivakumar, Stephen W. Keckler, Charles R. Moore, and Doug Burger, "Exploiting Microarchitectural Redundancy For Defect Tolerance", Oct. 2003, The 21st International Conference on Computer Design (ICCD).

Jayanth Srinivasan, Sarita V. Adve, Pradip Bose, Jude A. Rivers "Exploiting Structural Duplication for Lifetime Reliability Enhancement", Jun. 2005, The Proceedings of the 32nd International Symposium on Computer Architecture (ISCA'05).

Bernick, D., Bruckert, B., Vigna, P. D., Garcia, D., Jardine, R., Klecka, J., Smullen, J., "NonStop® Advanced Architecture", 2005, pp. 12-21, Proceedings of the International Conference on Dependable Dependable Systems and Networks (DSN'05).

T.J. Siegel, et al., "IBM's S/390 G5 Microprocessor Design" Mar./Apr. 1999, pp. 12-23, IEEE Micro, vol. 19, No. 2.

* cited by examiner

FIG. 1A
(Conventional)

FIG. 1B
(Conventional)

Ring Configuration Unit (RCU)
Internal Design

CHIP MULTIPROCESSOR WITH CONFIGURABLE FAULT ISOLATION

BACKGROUND

1. Technical Field

The present application relates generally to computer systems and microprocessors. More particularly, the present application relates to chip multiprocessors.

2. Description of the Background Art

Technology scaling and decreasing power efficiency of uniprocessors has led to the emergence of chip multiprocessors (CMP) as a hardware paradigm. In a CMP, multiple processor cores are integrated on a single chip and are available for general purpose computing.

Components on the die of a CMP (on-chip components) may be shared to improve resource utilization. For example, cores may be shared via hyperthreading, and last level caches and input/output (I/O) interfaces may be shared. In addition, typically off-chip components, such as memory controllers and I/O links, are being integrated onto CMPs.

While the above-mentioned sharing and integration may provide better resource utilization and improved performance, it also results in lower overall reliability. The lower overall reliability is because an error in any one component of the chip may lead to the non-availability of the entire CMP. For example, single processor failure typically results in the loss of availability of all processors on that CMP. Also, failure in a shared component like the cache or memory controller typically affects all the cores sharing that component. The failure in time (FIT) of the individual cores, caches, memory and I/O components may add up to a rather high FIT for the CMP as a whole.

SUMMARY

One embodiment relates to a high-availability computation apparatus including a chip multiprocessor. Multiple fault zones are configurable in the chip multiprocessor, each fault zone being logically independent from other fault zones. Comparison circuitry is configured to compare outputs from redundant processes run in parallel on the multiple fault zones.

Another embodiment relates to a method of operating a high-availability system using a chip multiprocessor. A redundant computation is performed in parallel on multiple fault zones of the chip multiprocessor and outputs from the multiple fault zones are compared. When a miscompare is detected, an error recovery process is performed.

Other embodiments, aspects, and features are also disclosed.

DETAILED DESCRIPTION

Figure 1A:
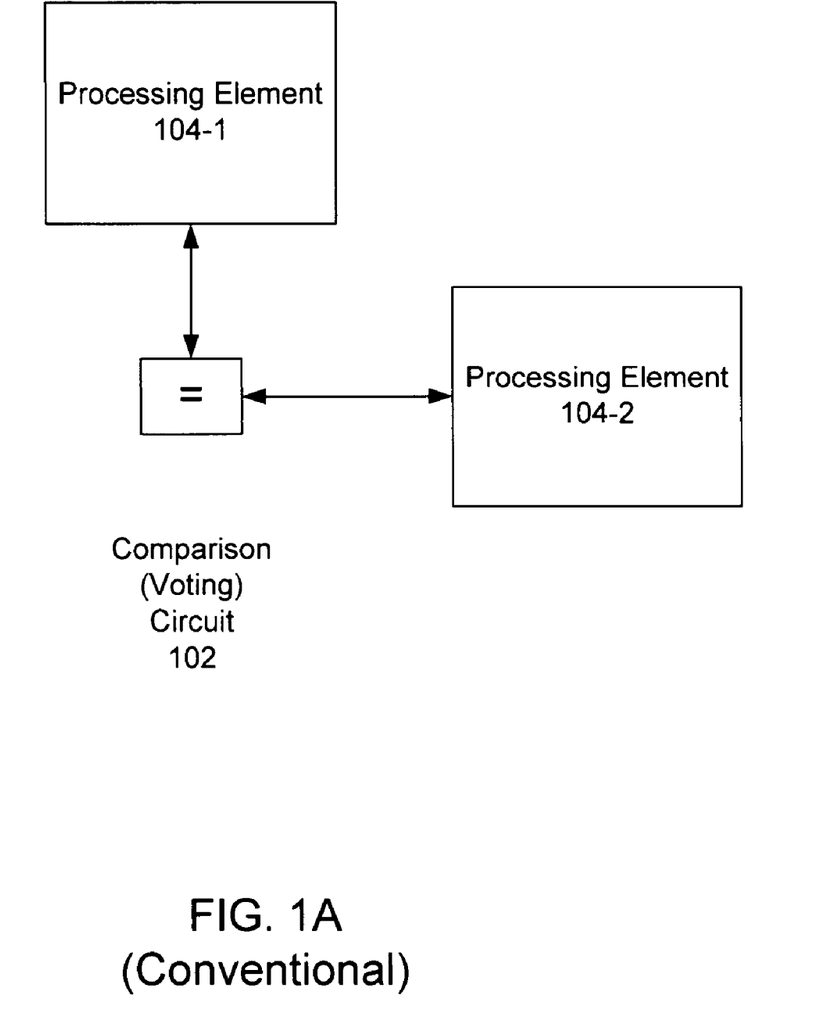
FIGS. 1A and 1B are schematic diagrams depicting a conventional highly-available system architecture using chip multiprocessors.
Figure 1B:
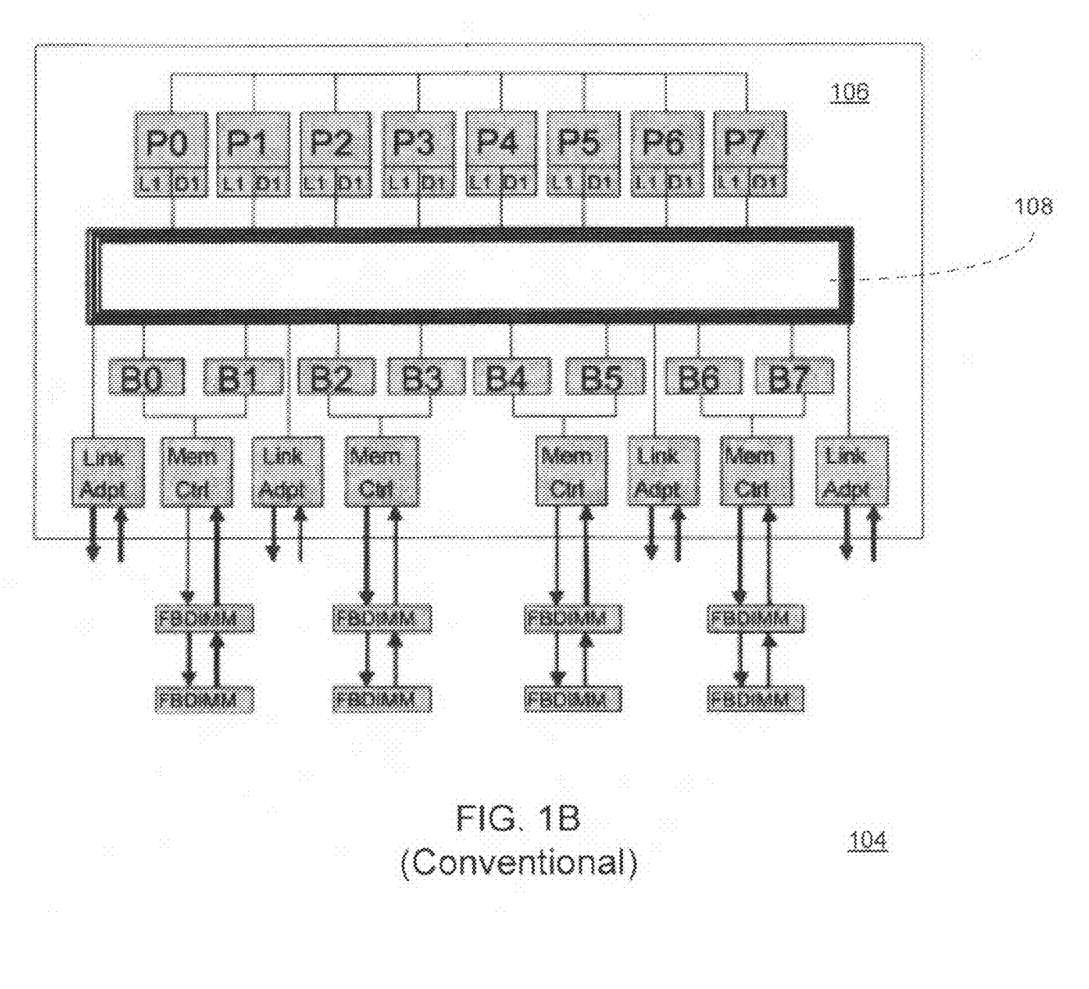

FIGS. 1A and 1B are schematic diagrams depicting a conventional highly-available system architecture using chip multiprocessors. Shown in FIG. 1A is a comparison (voting) circuit 102 which receives output from multiple redundant processing systems 104. Each processing system 104 may utilize a CMP 106, as shown, for example, in FIG. 1B.

In the particular system depicted in FIG. 1A, the comparison circuit 102 receives outputs from two redundant processing systems 104-1 and 104-2 (dual modular redundancy or DMR). In this case, if the comparison circuit 102 detects a mismatch in the two outputs, then an error is indicated. Recovery from the error may be accomplished by various conventional techniques, such as roll-back recovery for soft errors.

In other conventional systems, the comparison circuit 102 may receive outputs from three (or more) redundant processing systems 104. With three redundant systems 104 (triple modular redundancy or TMR), the comparison circuit 102 may determine which output is in error by assuming that the other two (matching) outputs are correct (two-to-one vote). In that case, the erroneous output may be discarded.

The example CMP 106 depicted in FIG. 1B is a generalization of conventional CMP designs from vendors such as Intel Corporation of Santa Clara, Calif., Advanced Micro Devices Inc. of Sunnyvale, Calif., and Sun Microsystems Inc. of Santa Clara, Calif. This generalized CMP design includes eight processing cores (P0, P1, P2, ..., P7), eight private L1 (level 1) caches (L1 for the instruction caches and D1 for the data caches), a bidirectional ring interconnect 108, a shared L2 (level 2) cache (organized into eight banks, B0, B1, B2, ..., B7), four shared memory controllers (Mem Ctrl), and four shared input/output interface units (Link Adpt). As shown, the memory controllers are communicatively coupled to main memory (FBDIMM).

While a bidirectional ring interconnect 108 is shown in FIG. 1B, other types of communication systems may be used, such as meshes. Further, although the illustrated design has all cores on one side and the shared cache banks on the other side (a "dance hall" architecture), other designs may have banks and cores interleaved.

The shared input/output interface units (Link Adpt) of the CMP 106 are communicatively coupled to the comparison circuit 102 in FIG. 1A. In this conventional architecture, the system 104 acts as a single processing element to the comparison circuit 102.

Applicant has identified a drawback to the conventional architecture discussed above. The conventional CMP 106 is designed for efficient resource utilization. However, the conventional CMP 106 lacks fault isolation properties. For example, fault isolation is lacking at the core level, at the shared L2 cache, and at the shared memory controllers. As a result of the lack of fault isolation within each CMP 106, redundancy is achieved only by using multiple CMPs 106 to provide the desired replication of processing elements.

Applicant has determined novel designs for achieving a highly-available processing system using one or more chip multiprocessors. These designs provide and utilize fault isolation within a chip multiprocessor.

Figure 2:
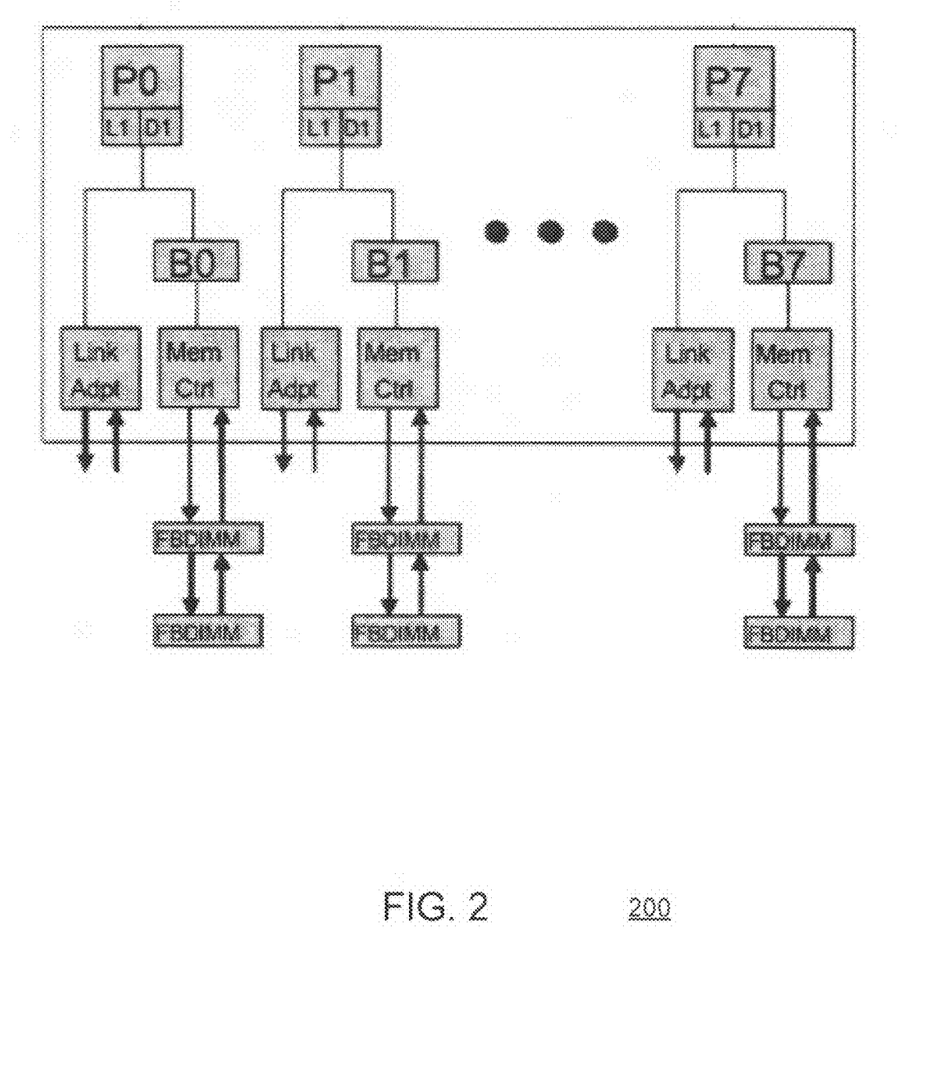
FIG. 2 is a schematic diagram showing a highly-available system architecture using a chip multiprocessor designed with complete fault isolation in accordance with an embodiment of the invention.

FIG. 2 is a schematic diagram showing a chip multiprocessor 200 designed with complete fault isolation. Here, the chip multiprocessor 200 is designed with multiple independent microprocessors fabricated on the same die. The illustrated example shown includes eight independent systems, each system including a processor core (P0, P1, P2, P3, P4, P5, P6, or P7), a private first level cache (L1 for instructions and D1 for data), a private second level cache (B0, B1, B2, B3, B4, B5, B6, or B7), an independent memory controller (Mem Ctrl), and an independent input/output interface (Link Adpt).

However, the architecture of FIG. 2 has several disadvantages. By not sharing cache resources and other elements, the overall performance of the system is significantly reduced. Similarly, by not sharing pins, the valuable pin resource would be inefficiently used.

Figure 3A:
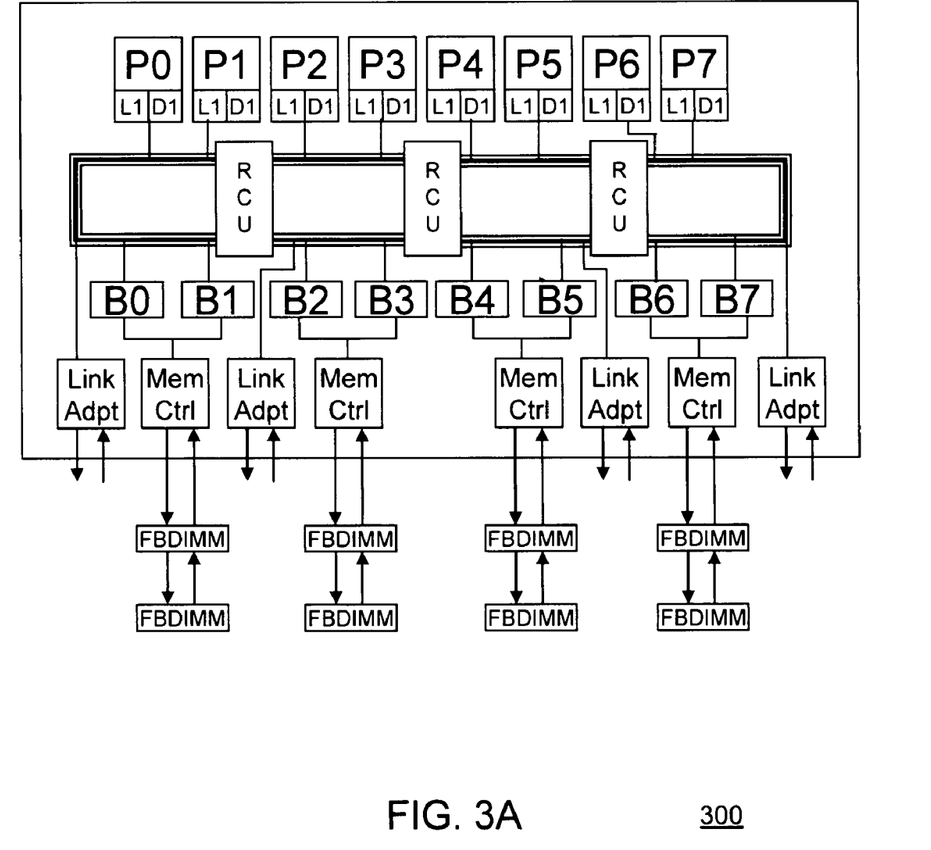
FIG. 3A is a schematic diagram of a chip multiprocessor with configurable isolation in an unconfigured state in accordance with an embodiment of the invention.

FIG. 3A is a schematic diagram of a chip multiprocessor 300 with configurable isolation in an unconfigured state in accordance with an embodiment of the invention. In accordance with one embodiment, the CMP 300 may be dynamically reconfigurable into a higher-availability configuration or a higher-performance configuration by setting a small number of control points in the design.

This capability enables the CMP 300 to support higher-availability on demand. Note that providing this capability may be accomplished with relatively small changes to the ring interconnect and bank addressing, leaving the rest of the CMP 300 unchanged.

Regarding the ring interconnect, cross links (see, for example, the ring configuration units or RCUs which are described further below) may be activated to partition a larger ring to create to two logically independent rings. The cross links may be less than a millimeter long, and the activation of the cross links may require insertion of a multiplexer at the input of a ring interface incoming data port. These cross links and input multiplexers are a small additional fixed cost in terms of area and power which would not significantly increase the cost of design in cases where higher availability is not desired. Regarding the bank addressing, in higher-availability mode, the interleave among level 2 cache banks would use one fewer bit, interleaving references among half the banks, so as to keep references within the same color.

Figure 3B:
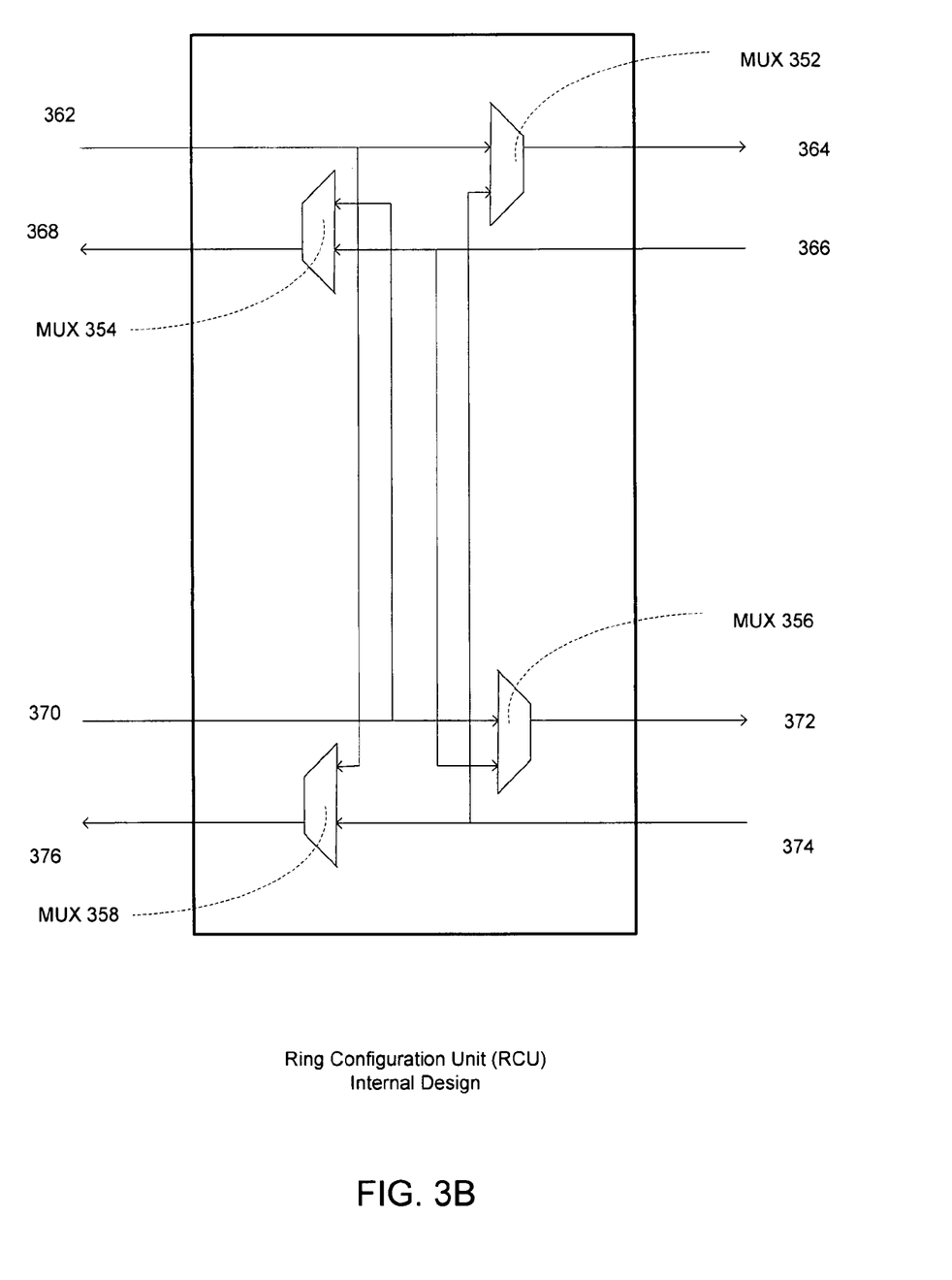
FIG. 3B is a circuit diagram of a ring configuration unit (RCU) in accordance with an embodiment of the invention.

FIG. 3B is a circuit diagram of a ring configuration unit (RCU) in accordance with an embodiment of the invention. As shown, an RCU may be implemented using various multiplexers (MUXes). The MUXes may be controlled to "pass through" the signals to create a larger ring, or partition to divide the larger ring into separate segments.

For example, in the "pass through" configuration, the MUXes would be configured as follows. MUX 352 would be configured to "pass through" signal 362 to output 364. MUX 354 would be configured to pass through signal 366 to output 368. MUX 356 would be configured to pass through signal 370 to output 372. Finally, MUX 358 would be configured to pass through signal 374 to output 376.

On the other hand, in the partition configuration, the MUXes would be configured as follows. MUX 352 would be configured to "redirect" or "circulate" signal 374 to output 364. MUX 354 would be configured to redirect or circulate signal 370 to output 368. MUX 356 would be configured to redirect or circulate signal 366 to output 372. Finally, MUX 358 would be configured to redirect or circulate signal 362 to output 376.

While a configurable ring interconnect is described in detail herein, other configurable communication systems and designs may be utilized in alternate embodiments of the invention. For example, configurable busses, configurable switching meshes, or configurable crossbar switching systems may be utilized. Alternatively, the isolation of the interconnection into logically-isolated zones may be performed through software control on routing network traffic.

As discussed below, the chip multiprocessor 300 of FIG. 3A may be configurable into one or more "color" or fault zones. As used herein, a color or fault zone is a logically-isolated zone. The assignment of color zones (fault zones) to specific components of the chip multiprocessor may be based on pre-determined policies to optimize performance or maximize fault coverage.

Various components may require modification to support multiple color zones. For example, additional support for the shared cache system to enable reconfiguration into multiple color zones may include extra tag bits and added control circuitry.

Figure 4A:
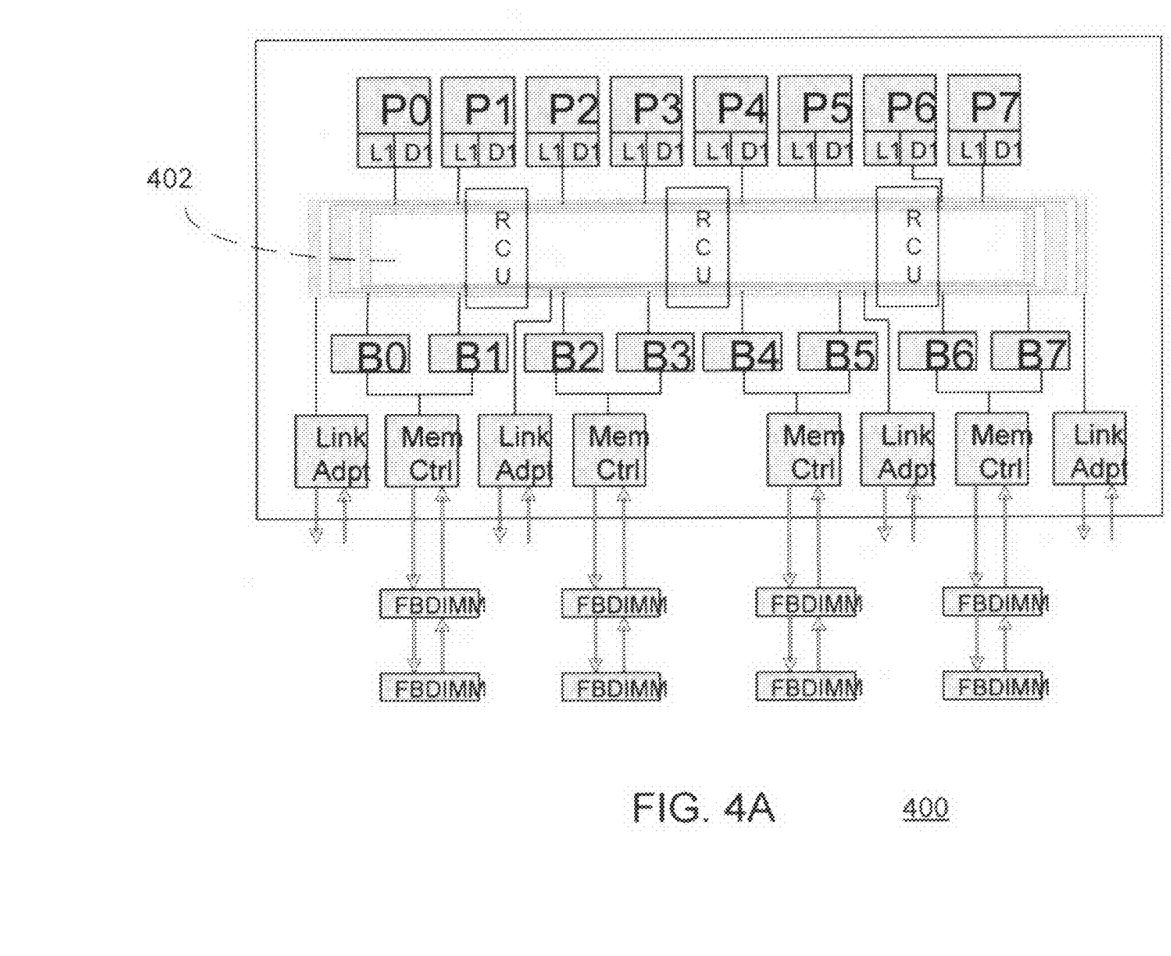
FIG. 4A is a schematic diagram of a chip multiprocessor with configurable isolation as configured for a single color (fault) domain in accordance with an embodiment of the invention.

FIG. 4A is a schematic diagram of a chip multiprocessor 400 with configurable isolation as configured for a single color (fault) domain 402 in accordance with an embodiment of the invention. In this case, the CMP 400 is configured so as to operate similar to the CMP 106 discussed above in relation to FIG. 1B. To provide the ring interconnect for the single color domain 402, each of the three RCUs shown may be configured to be in the "pass through" configuration. This effectively results in a single bi-directional ring interconnect for the single color domain 402.

Like the conventional CMP 106, when the configurable CMP is in this single color domain configuration 400, it provides for efficient resource utilization. However, this single color domain configuration 400 lacks fault isolation properties.

Figure 4B:
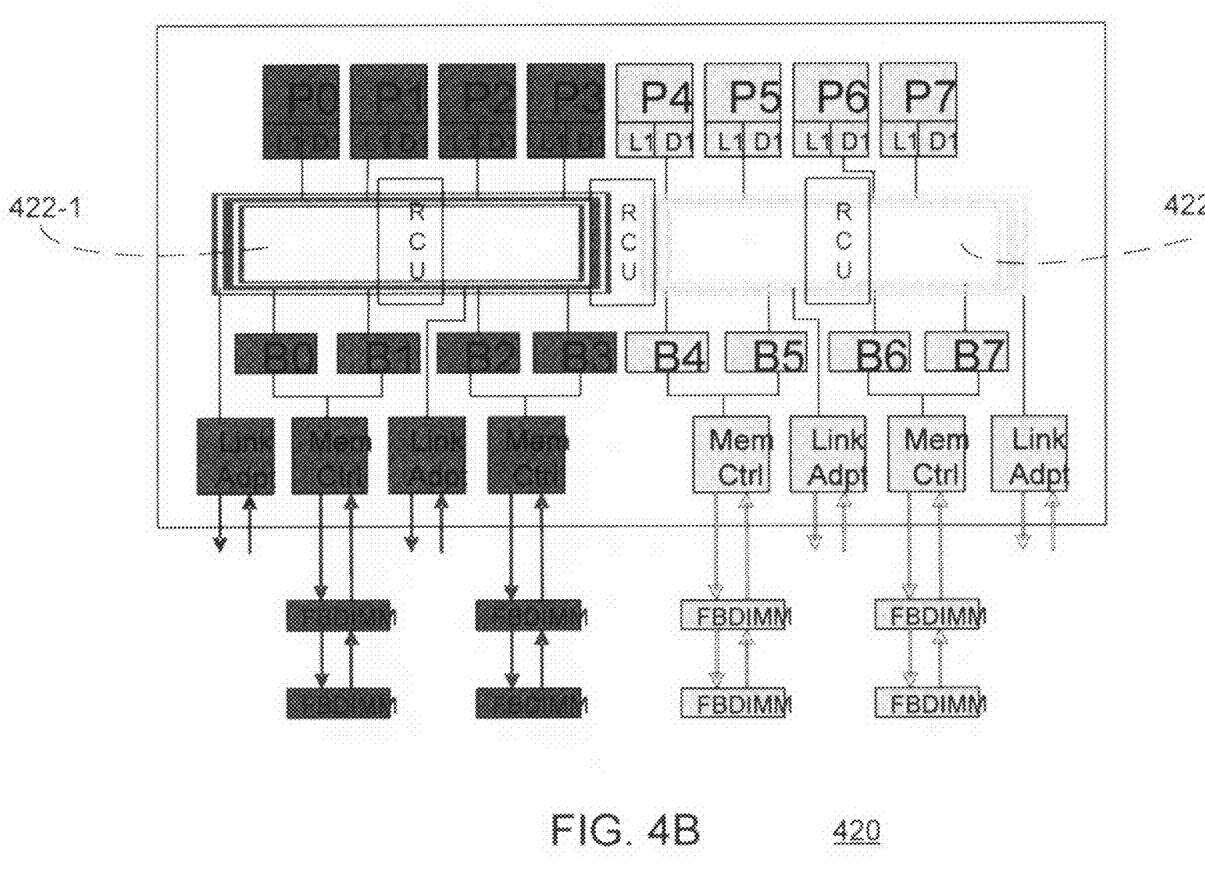
FIG. 4B is a schematic diagram of a chip multiprocessor with configurable isolation as configured for two color (fault) domains in accordance with an embodiment of the invention.

FIG. 4B is a schematic diagram of a chip multiprocessor 420 with configurable isolation as configured for two color (fault) domains in accordance with an embodiment of the invention. To provide the ring interconnect for the two color domains 422-1 and 422-2, the "outer" two of the three RCUs shown may be configured to be in the "pass through" configuration, while the "center" RCU is configured to be in the partition configuration. This effectively results in two bi-directional ring interconnects for the two color domains 422-1 and 422-2.

A first color zone includes a first group of four processors (P0, P1, P2, and P3), while a second color zone includes a second group of four processors (P4, P5, P6, and P7). A first bi-directional ring interconnect 422-1 interconnects the processors of the first color zone with a shared L2 cache having four banks (B0, B1, B2, and B3) and also with shared input/output interface devices (Link Adpt). A second bi-directional ring interconnect 422-2 interconnects the processors of the second color zone with a shared L2 cache having four banks (B4, B5, B6, and B7) and also with shared input/output interface devices (Link Adpt). In this particular implementation, each pair of L2 cache banks (B0 and B1, B2 and B3, B4 and B5, and B6 and B7) shares a memory controller (Mem Ctrl) such that each color zone has two memory controllers. The memory controllers of each color zone are configured to access main memory (FBDIMMs) for that color zone.

The CMP 420 of FIG. 4B is configured so that the colored domains may be units of fault containment or isolation. Any failure in a color shared component affects computation only on the cores mapped to that color. In accordance with an embodiment of the invention, to ensure that a failure in one color domain does not impact any of the other colored domains on the CMP 420, logical isolation may be applied for interconnect, caches, and memory controllers. The logical isolation allows components to be isolated at the hardware level.

In one application of the CMP 420 of FIG. 4B, resources from the two color zones may be used to run one or more dual modular redundant (DMR) process pairs. In that case, when higher availability is required, computations in the first color zone would be replicated by computations in the second color zone. For example, for a higher-availability higher-cost solution, the voters may be implemented using hardware circuitry in I/O hubs connected to a first color link adapter and a second color link adapter. For a lower-availability lower-cost solution, the voters may be implemented in hypervisors that communicate between the colored partitions through input/output.

Physical memory may be partitioned between the two logical processors using unique virtual-to-physical memory mapping. To provide complete memory fault isolation, the operating system may be configured to support statically-partitioned TLB (translation lookaside buffer) entries. However, redundant TLBs may also be used for fault tolerance.

Once a fault is detected in the CMP 420, a reconfiguration process may be performed. For example, a core processor that fails may be deleted (put out of commission), but the remaining cores are then still usable.

As another example, if a failure in a cache bank is detected that cannot be corrected by line sparing (i.e. the failure is a logic failure in the bank controller), then the other cache bank sharing the same memory controller may be reconfigured to cache all lines serviced by that memory controller. This may be enabled by the provision of an extra bit in the bank cache tags and a mode bit in the cache bank.

As yet another example, if a memory controller in a color domain fails, that color domain may be reconfigured to use a single memory controller. This may be performed by caching all lines in the cache banks associated with the failed memory controller in the remaining controller's banks and may be enabled using one more bit in the cache tags and a second mode bit.

Given the large number of bits in a typical cache line (over 600 bits for a 64 B cache line with ECC plus previously required tag bits), providing two more bits to enable such reconfigurations is very modest area overhead.

While the two color zones are shown in FIG. 4B, the number of color zones may be larger than two to provide further redundancy or to provide smaller granularity of fault containment. For example, three colors may be used either in a triple modular redundant (TMR) configuration or to have fewer cores in a fault domain.

Figure 4C:
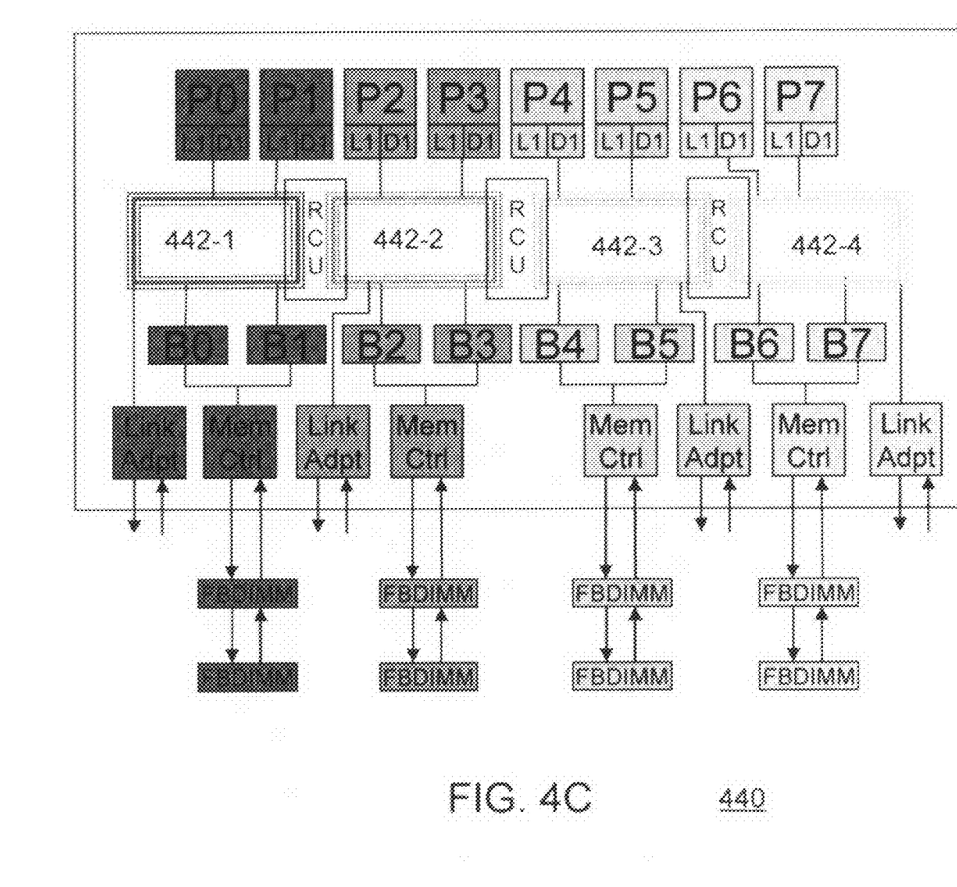
FIG. 4C is a schematic diagram of a chip multiprocessor with configurable isolation as configured for four color (fault) domains in accordance with an embodiment of the invention.

FIG. 4C is a schematic diagram of a chip multiprocessor 440 with configurable isolation as configured for four color (fault) domains in accordance with an embodiment of the invention. To provide the ring interconnect for the four color domains 442-1, 442-2, 442-3, and 442-4, each of the three RCUs shown may be configured to be in the partition configuration. This effectively results in four bi-directional ring interconnects for the four color domains 442-1, 442-2, 442-3, and 442-4.

A first color zone includes a first group of two processors (P0 and P1). A second color zone includes a second group of two processors (P2 and P3). A third color zone includes a third group of two processors (P4 and P5). Finally, a fourth color zone includes a fourth group of two processors (P6 and P7).

A first bi-directional ring interconnect 442-1 interconnects the processors of the first color zone with a shared L2 cache having two banks (B0 and B1) and also with shared input/output interface devices (Link Adpt). A second bi-directional ring interconnect 442-2 interconnects the processors of the second color zone with a shared L2 cache having two banks (B2 and B3) and also with shared input/output interface devices (Link Adpt). A third bi-directional ring interconnect 442-3 interconnects the processors of the third color zone with a shared L2 cache having two banks (B4 and B5) and also with shared input/output interface devices (Link Adpt). Finally, a fourth bi-directional ring interconnect 442-4 interconnects the processors of the fourth color zone with a shared L2 cache having two banks (B6 and B7) and also with shared input/output interface devices (Link Adpt).

In this particular implementation, each pair of L2 cache banks (B0 and B1, B2 and B3, B4 and B5, and B6 and B7) shares a memory controller (Mem Ctrl) such that each color zone has a memory controller. The memory controller of each color zone is configured to access main memory (FBDIMMs) for that color zone.

Like the CMP 420 of FIG. 4B, the CMP 440 of FIG. 4C is configured so that the colored domains may be units of fault containment or isolation. Any failure in a color shared component affects computation only on the cores mapped to that color. In accordance with an embodiment of the invention, to ensure that a failure in one color domain does not impact any of the other colored domains on the CMP 440, logical isolation may be applied for interconnect, caches, and memory controllers. The logical isolation allows components to be isolated at the hardware level.

In one example application of the CMP 440 in FIG. 4C, the CMP 440 may be used to run different processes in TMR using triplets of three different colors each. For example, one TMR process may run simultaneously on the first, second and third colored domains, while a second process may run simultaneously on the second, third, and fourth colored domains. In this example, DMR processing may simultaneously be supported on the first and fourth colored domains to balance load among the colored domains. Various other applications of the CMP 440 are also possible that also utilize the reconfiguration and fault isolation properties of the architecture.

Figure 5:
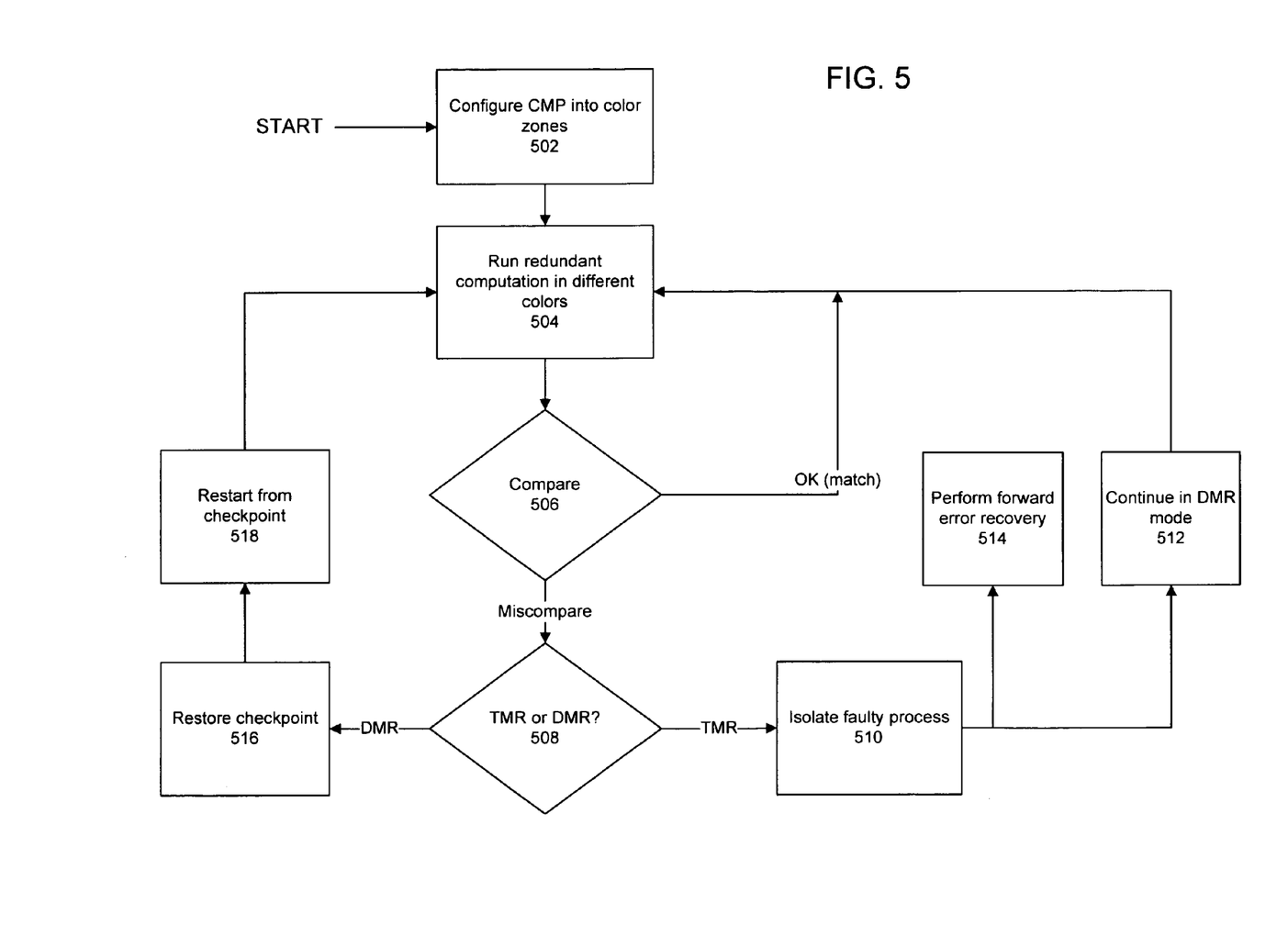
FIG. 5 is a flow chart showing a method of operating a high-availability system using a chip multiprocessor with multiple color zones in accordance with an embodiment of the invention.

FIG. 5 is a flow chart showing a method of operating a high-availability system using a chip multiprocessor with multiple color zones in accordance with an embodiment of the invention. The CMP is configured 502 into multiple color zones, for example, by activating cross links and so forth as discussed above.

Redundant computations are then run 504 in the different color zones. These redundant computations may be utilized, for example, for DMR or TMR operation. Comparison is made 506 of the redundant outputs.

If the comparison 506 indicates that the redundant outputs match (i.e. that the redundant operation is going okay, without any detected error), then the method continues to run 504 the redundant computation in the different colors.

On the other hand, if the comparison 506 indicates that the redundant outputs do not match (i.e. that an error is detected due to a miscompare), then the method goes on with a procedure to deal with a detected error. As shown in the flow chart of FIG. 5, the procedure may depend 508 on whether the redundant computation is being run in TMR or DMR.

If the redundant computation is in a TMR mode, then the method may, for example, perform a roll-forward recovery procedure. In particular, per FIG. 5, the method may determine 510 the faulty process (by way of a 2-to-1 vote count). Per block 512, the faulty process may then be isolated and computation may then be continued in DMR mode. In addition, roll-forward error recovery may be performed 514. Such roll-forward error recovery takes the faulty process in its erroneous state and corrects it so that the process may then rejoin in the redundant computation.

On the other hand, if the redundant computation is in a DMR mode, then the method may, for example, perform a roll-back recovery procedure. In particular, per FIG. 5, the method may restore 516 a recent checkpoint at which there was no detected error in the states of the redundant processes. The redundant computation may then be restarted 518 from that checkpoint.

Figure 6:
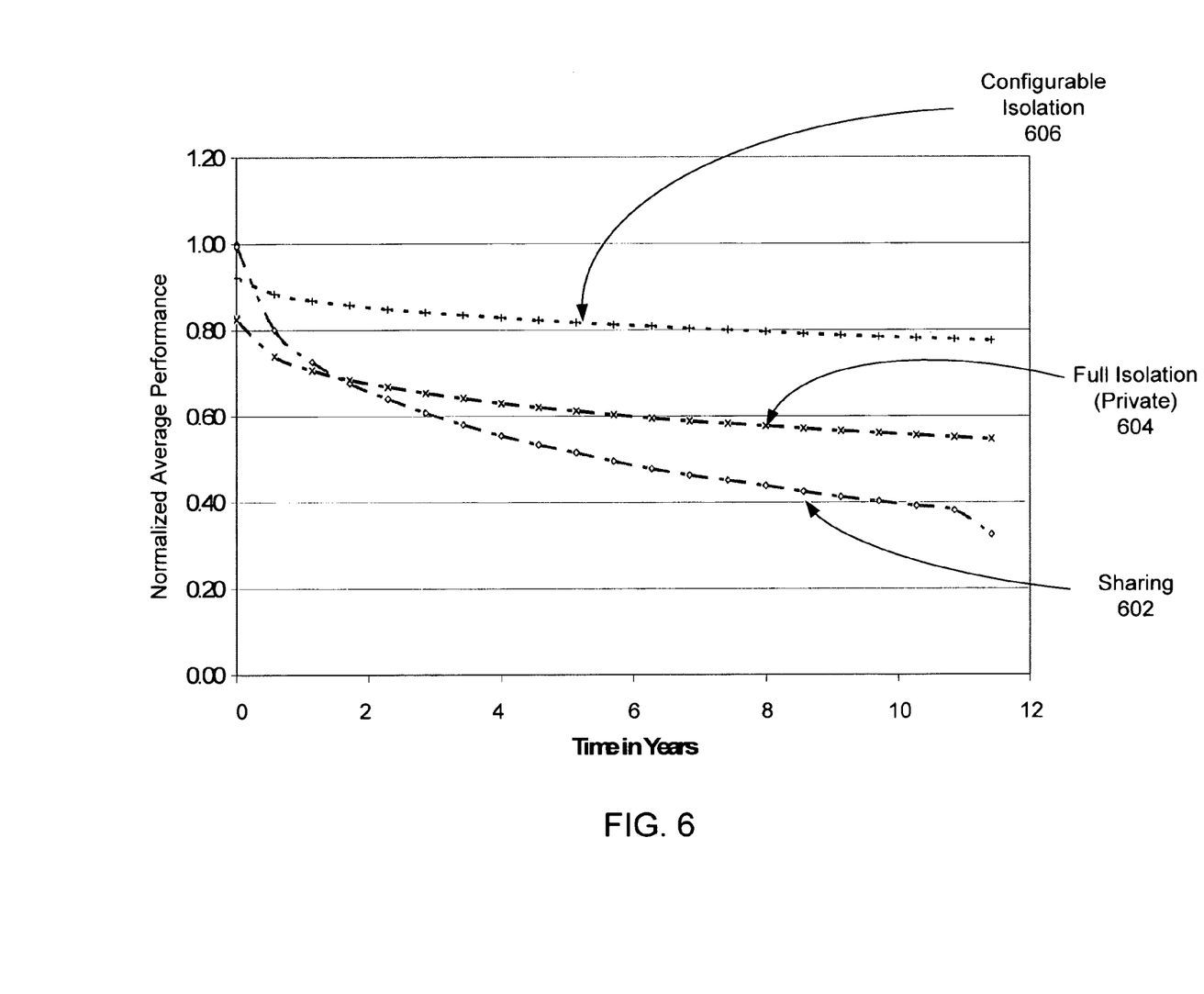
FIG. 6 is a plot of results from a Monte-Carlo simulation showing benefits of an embodiment of the invention.

FIG. 6 is a plot of results from a Monte-Carlo simulation showing benefits of an embodiment of the invention. The Monte-Carlo simulations were performed assuming a heavy workload on a single 8-core system under three configurations: (a) full-resource sharing 602; (b) full isolation (private resources) 604; and (c) configurable isolation 606.

All three configurations were assumed to be running in a DMR mode. Overheads of using colored domains was included in the performance evaluation of the configurable isolation design 606. In the DMR configuration, each color is assumed to have access to only half the cache, and so we model the performance assuming two L2 caches, each half the size of the cache in the shared configuration.

The fault model used was based on data of failure-in-time rates and distributions of errors per component. For reasons of simplification, the fault model used was limited to performance impact from hard faults. Reconfiguration was assumed at each fault instance for the configurable isolation design 606. It was assumed that reconfiguration is performed only at full component granularity.

The vertical (Y) axis shows the mean cumulative performance normalized to the baseline performance of the fully-shared configuration with no faults and averaged across the 10,000 simulations. The horizontal (X) axis shows time, measured in years.

As shown in FIG. 6, for all three configurations, the average performance begins high and then degrades with the occurrence of hard errors over time. The shared configuration 602 begins with the highest average performance at time zero, but as time progresses, it performs the worst with a degradation of about 30% to 35% after the first couple of years and a degradation of close to 50% by the end of five years.

The fully isolated configuration 604, by virtue of its lack of resource sharing, begins with the lowest average performance at time zero. However, the fully isolated configuration 604 becomes performance competitive with the shared configuration 602 at around two years (at the crossover shown in FIG. 6).

The configurable isolation design 606 achieves the most attractive average performance. The performance of the configurable isolation design 606 starts off at time zero in between the performance of the other two configurations. Shortly thereafter, sometime during the first year, the average performance of the configurable isolation design 606 surpasses that of the shared configuration 602 and thereafter continues to have an average performance advantage.

Note that reconfiguration provides performance benefits for the configurable isolation design 606 as compared to the fully isolated configuration 604. Consider the case where one component fails, for example, a bank controller. In the fully isolated configuration 604, the entire core associated with the failed bank controller is taken out of commission. In contrast, in the configurable isolation design 606, the core associated with the failed bank controller may be reconfigured to use other banks of the same color. As discussed above, this benefit may be provided with relatively little area overhead.

Note further that a minimum number of cores in a fault zone may depend on a number of factors. These factors may include, for example, the number of color zones, the number of RCUs, and the number of cores in the system. The detailed embodiment discussed above in relation to the figures only illustrates an example case for the number of cores in a fault zone, but other configurations are possible depending on such factors.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A chip multiprocessor comprising:
   a plurality of processor cores for executing instructions;
   a plurality of memory controllers for communicating with main memory;
   a plurality of input/output interfaces for receiving and transmitting data; and
   a communication system including a ring interconnect configured to interconnect the processor cores to the memory controllers and the input/output interfaces,
   wherein the communication system further includes at least one ring configuration unit configured to partition the ring interconnect into multiple fault zones, each fault zone being logically isolated from other fault zones.

2. The chip multiprocessor of claim 1, wherein the at least one ring configuration unit is configured to partition the ring interconnect into at least two fault zones, and wherein at least one dual modular redundant (DMR) process is run simultaneously in two of the fault zones.

3. The chip multiprocessor of claim 1, wherein the at least one ring configuration unit includes two ring configuration units configured to partition the ring interconnect into three fault zones, and wherein at least one triple modular redundant (TMR) process is run simultaneously in three of the fault zones.

4. The chip multiprocessor of claim 3, further wherein at least one dual modular redundant (DMR) process is run simultaneously in two of the three fault zones.

5. The chip multiprocessor of claim 1, wherein the at least one ring configuration unit includes three ring configuration units configured to partition the ring interconnect into four fault zones, wherein a first TMR process is run on a first set of three of the four fault zones, and a second TMR process is run on a second set of three of the four fault zones, and wherein the first and second sets have at least one different fault zone.

6. The chip multiprocessor of claim 1, wherein a reconfiguration process is performed once a fault is detected.

7. The chip multiprocessor of claim 6, wherein when failure of a core processor in a fault zone is detected, then the reconfiguration process removes the failed core processor from operation, while allowing remaining core processors in the fault zone to continue to operate.

8. The chip multiprocessor of claim 6, wherein each memory controller is associated with a plurality of cache banks, and wherein when a logic failure is detected in a controller of a cache bank, then at least one other cache bank sharing a memory controller with the failed cache bank is reconfigured to cache lines previously serviced by the failed cache bank.

9. The chip multiprocessor of claim 6, wherein each fault zone includes at least two memory controllers, and wherein when failure of a memory controller in a fault zone is detected, then the reconfiguration process removes the failed memory controller from operation and reconfigures the fault domain to utilize one or more remaining memory controller in the fault domain.

10. The chip multiprocessor of claim 1, wherein the at least one ring configuration unit is configured to partition the bi-directional ring interconnect of the communication system into multiple independent bi-directional ring interconnects, one bi-directional ring interconnect for each fault zone.

11. The chip multiprocessor of claim 10, wherein the at least one ring configuration unit comprises at least one multiplexer.

12. The chip multiprocessor of claim 1, wherein the at least one ring configuration unit comprises at least one multiplexer.

13. The chip multiprocessor of claim 1, wherein the at least one ring configuration unit provides isolation of interconnection between the fault zones through software control on routing network traffic.

14. The chip multiprocessor of claim 1, further comprising a shared cache for each fault zone.

15. The chip multiprocessor of claim 14, wherein each shared cache comprises a plurality of cache banks, and wherein each memory controller is associated with at least two said cache banks.

16. The chip multiprocessor of claim 14, wherein each shared cache comprises one or more extra tag bits and added control circuitry to enable reconfiguration into the multiple fault zones.

17. The chip multiprocessor of claim 1, wherein assignment of the fault zones to specific components is based on pre-determined policies to optimize performance or maximize fault coverage.

18. A method of operating a high-availability system using a chip multiprocessor, the method comprising:
   partitioning, by a ring configuration unit, a ring interconnect into multiple fault zones, wherein each fault zone is logically independent from other fault zones;
   performing a redundant computation in parallel on the multiple fault zones of the chip multiprocessor;
   comparing outputs from the multiple fault zones; and
   when a miscompare is detected, then performing an error recovery process.

19. The method of claim 18, wherein the error recovery process comprises determining whether the redundant computation comprises a triple redundant modular computation.

20. The method of claim 19, wherein the error recovery process for a dual redundant modular computation comprises restoring a checkpoint and restarting from the checkpoint.

21. The method of claim 18, wherein the error recovery process for a triple redundant modular computation comprises isolating a faulty process and continuing the computation in a dual modular redundancy mode while performing forward error recovery for the faulty process.

22. A high-availability computation apparatus including a chip multiprocessor, the apparatus comprising:
   multiple fault zones configurable in the chip multiprocessor, wherein each fault zone is logically independent from other fault zones;
   a ring configuration unit configured to partition a ring interconnect into the multiple independent fault zones; and
   comparison circuitry for comparing outputs from redundant processes run in parallel on the multiple fault zones.

23. The apparatus of claim 22, further comprising dynamically reconfigurable circuitry for changing the chip multiprocessor between a higher-availability configuration and a higher-performance configuration, and
   wherein the ring configuration unit includes at least one multiplexer configured to partition the ring interconnect into the multiple independent fault zones.

* * * * *